(12) United States Patent
Bee et al.

(10) Patent No.: US 9,547,711 B1
(45) Date of Patent: Jan. 17, 2017

(54) SHARD DATA BASED ON ASSOCIATED SOCIAL RELATIONSHIP

(71) Applicant: Google Inc., Mountain View, CA (US)

(72) Inventors: Gavin Edward Bee, Ontario (CA);
Anish Acharya, Ontario (CA); John Mathias Barr, Ontario (CA)

(73) Assignee: GOOGLE INC., Mountain View, CA (US)

( * ) Notice: Subject to any disclaimer, the term of this patent is extended or adjusted under 35 U.S.C. 154(b) by 293 days.

(21) Appl. No.: 13/948,130

(22) Filed: Jul. 22, 2013

(51) Int. Cl.
*G06F 17/30* (2006.01)

(52) U.S. Cl.
CPC ..... *G06F 17/30598* (2013.01); *G06F 17/3071* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 2012/0254175 A1* | 10/2012 | Horowitz et al. | 707/737 |
| 2013/0290249 A1* | 10/2013 | Merriman et al. | 707/610 |
| 2014/0108421 A1* | 4/2014 | Isaacson et al. | 707/747 |
| 2014/0156632 A1* | 6/2014 | Yu | G06F 17/30469 |
| | | | 707/713 |
| 2015/0006482 A1* | 1/2015 | Hardy et al. | 707/613 |

* cited by examiner

*Primary Examiner* — Rehana Perveen
*Assistant Examiner* — Raheem Hoffler
(74) *Attorney, Agent, or Firm* — Lowenstein Sandler LLP

(57) ABSTRACT

A method includes identifying a plurality of content types in a database of a social network, wherein members produce and request content of different content types from the database. Job types to be performed on each content type are identified, when requests for content are received from members of the social network. A sharding process for each content type is selected based on the job types to be performed on the content types. The database is sharded into first group of shards for content types having job types that are parallel processing efficient and into second group of shards for content types having job types that are linear processing efficient. The first and second group of shards define a multi-shard database. Requests for contents are serviced from the first group or the second group of shards from the multi-shard database depending on the job types associated with the requests.

20 Claims, 6 Drawing Sheets

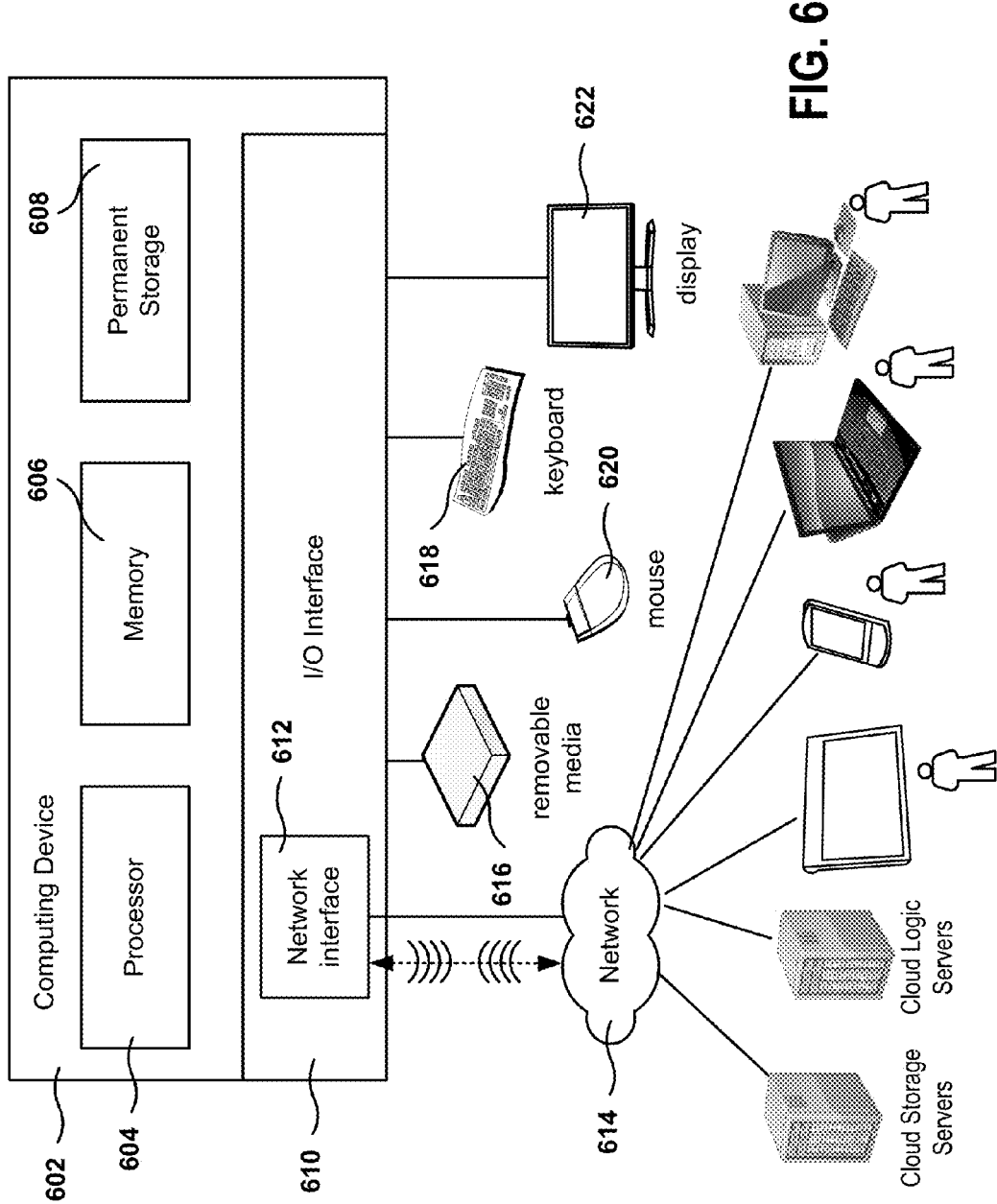

SHARD DATA BASED ON ASSOCIATED SOCIAL RELATIONSHIP

BACKGROUND

The present disclosure relates to methods, systems and computer programs for sharding user data.

With the great amount of data being generated on the Internet, there is a growing need for storing the data efficiently so that data retrieval can be done in a fast and efficient manner. Such need has only exacerbated with the growing popularity of social networks where huge amounts of data are being generated, retrieved and/or exchanged by millions and millions of users. Efficient retrieval of data is critical to provide an enriching social network experience as it directly translates to faster data look-up time for the users. Currently, data is being stored randomly making access to such data very inefficient. The random nature of storing data results in increased round trip latency and inefficient use of network resources. It is, therefore, desirable to find ways to store data in an intelligent manner to make storage and retrieval of data fast and efficient.

SUMMARY

Embodiments of the present disclosure define methods for sharding and distributing data obtained from a plurality of users of a social network so that such data can be accessed in a fast and efficient manner. It should be appreciated that the present disclosure can be implemented in numerous ways, e.g., a process, an apparatus, a system, or a method on a computer readable medium. Several embodiments of the present disclosure are described below.

In some embodiments, a method is disclosed. The method includes the following method operations: identifying a plurality of content types of content in the database of the social network, wherein members of the social network produce and request content from the database; identifying job types to be performed on each content type when requests from members of the social network are received; selecting a sharding process to use for each content type based on the job types to be performed on the content types; sharding the database into a first group of shards for content types having job types that are parallel processing efficient and into a second group of shards for content types that are linear processing efficient, the first and second group of shards define a multi-shard database; and servicing requests for content from the multi-shard database such that requests for content requiring parallel processing efficiency are provided data from the first group of shards and requests for content requiring linear processing efficiency are provided data from the second group of shards.

In some embodiment, the job type to be performed on a content type is selected from a plurality of possible job types that may operate on the content type. The selected job type for the content type has a statistical occurrence rate that is higher than the other job types within the plurality of job types.

In some embodiments, the job types to be performed on a content type is identified based on job processing characteristics associated with the job type. A set of pre-determined rules associate the processing characteristics of the job type to a sharding type.

In some embodiments, the first group of shards for job types that are parallel processing efficient are dispersed across a distributed network of processing machines.

In some embodiments, servicing the requests for content distributed across a network of processing machines includes engaging resources of select ones of the processing machines to process relevant content in parallel, wherein the requests include storage or retrieval of relevant content from the multi-shard database dispersed on the processing machines.

In some embodiments, the second group of shards for job types that are linear processing efficient are dispersed within a close cluster of processing machines that are situated in close processing proximity to one another.

In some embodiments, the dispersal of the second group of shards includes co-locating the shards in each processing machines of the close cluster.

In some embodiments, performance efficiency of each job type on the multi-shard database are monitored. When the performance efficiency of a job type drops below a pre-defined threshold value, content for the job type that was sharded and processed in accordance with the first sharding type are copied from the multi-shard database and are re-sharded in accordance with the second sharding type. The re-sharded content is used for servicing the requests for the job type that is to be performed on the content type.

In some embodiments, the content within the multi-shard database for the job type are replaced with the re-sharded content.

In some embodiments, the re-sharded content is discarded after completing servicing requests for content of the job type. In such embodiments, the re-sharded content do not replace the content for the job type in the multi-shard database.

In some embodiments, the pre-defined threshold value is a time-based value or a computation-based value.

In some embodiments, a method is disclosed. The method includes monitoring performance efficiency of each job type in a multi-shard database of a social network. The multi-shard database includes a plurality of content types of content generated and requested by members of the social network wherein one or more job types are performed on each content type. A job type whose performance efficiency has dropped below a pre-defined threshold value, is identified. Content that was sharded for the job type in accordance with a first sharding type are copied from the multi-shard database. The copied content for the job type is sharded and processed in accordance with a second sharding type. Requests for content for the job type are serviced using the content from the second sharding type.

In some embodiments, the re-sharded content for the job type are synchronized with the content in the multi-shard database.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

FIG. 6 illustrates a basic infrastructure of a computing device used in processing data obtained from a plurality of users in a social network, in one embodiment of the invention.

DETAILED DESCRIPTION

Figure 1:
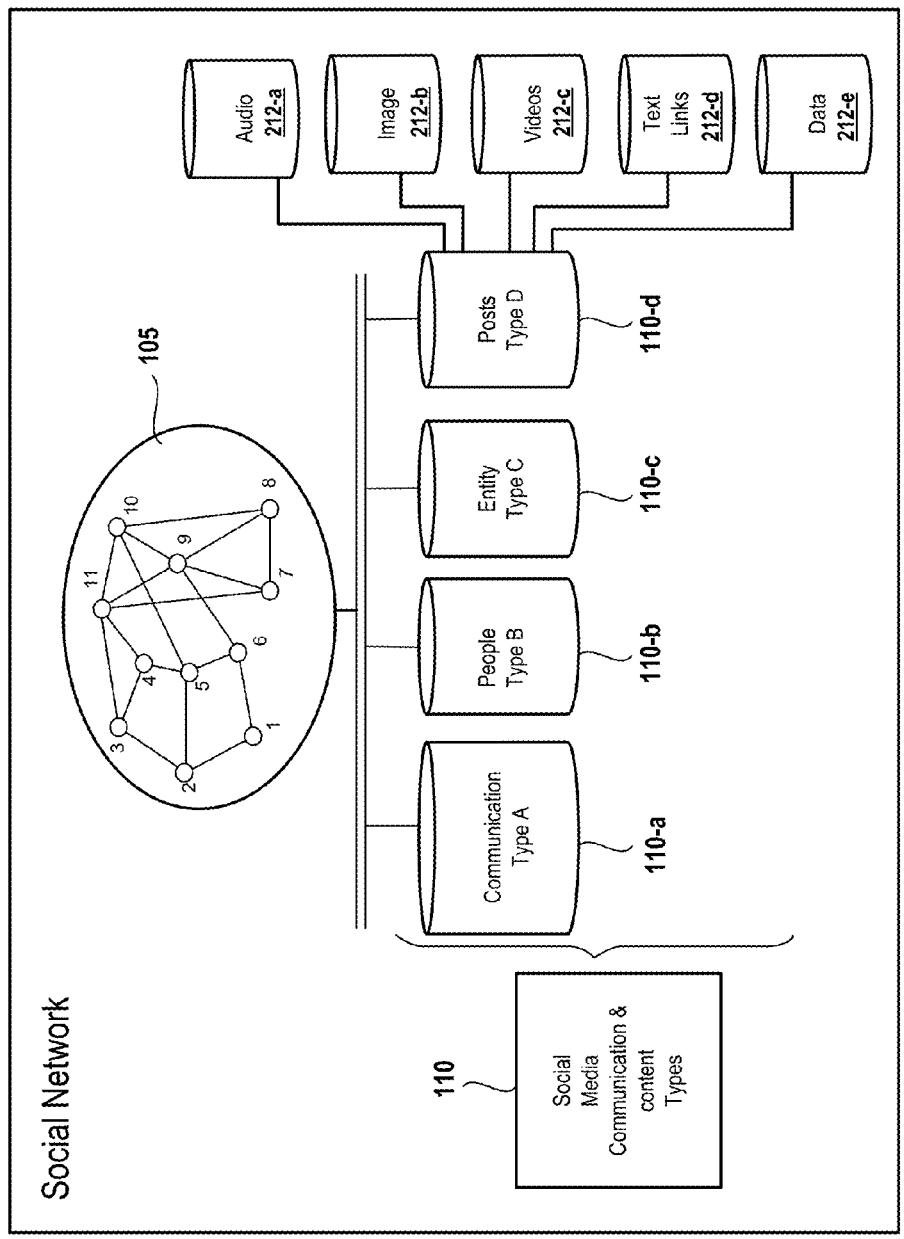
FIG. 1 illustrates a simplified social network of users or entities for implementing embodiments of the disclosure, in accordance with embodiments of the present disclosure.

The following embodiments describe methods, computer programs, and systems for implementing data sharding mechanism to efficiently shard content generated and shared by users and entities within a social network. Users and entities generate and share content of different content types within the social network. The sharding mechanism, of the various embodiments described herein, identifies job types that are to be performed on different content types, determines the processing characteristics of the job types, shards the content in the social network database and distributes the sharded content for storage in accordance to the processing characteristics associated with each job type. When requests for content is received for a job type designed for parallel processing efficiency, the sharding mechanism will determine the processing characteristics of the job type, identify the relevant content and process the relevant content using resources of a network of processing machines. Similarly, when requests for content is received for a job type designed for linear processing efficiency, the sharding mechanism will identify the relevant content based on the processing characteristics associated with the job type, and process the relevant content using resources of one or select few processing machines.

The data shards related to parallel processing and data shards related to linear processing together define a multi-shard database. Thus, any request for content from users are serviced using the shard data from the multi-shard database that was distributed in accordance to parallel processing or linear processing efficiencies. Sharding and distributing content based on performance efficiency of job types makes efficient use of resources of the respective processing machines enabling fast and efficient servicing of requests for content. Thus, in some embodiments, the content for the social network is sharded and the sharded content is distributed in accordance to the processing characteristics of the job types that will most likely be performed on content types associated with the content. A job type, based on its processing characteristics, will predict or suggest the look-up pattern or processing that will likely be performed on the content types of content stored for the social network.

In some embodiments, content associated with each content type can be processed by more than one job types based on the usage of content within the social network. In some embodiments, when more than one job-type can be performed on content of particular content type, the sharding mechanism may identify the job-type that has a higher statistical rate of occurrence for the content type within the social network and use the processing characteristics of the identified job-type when distributing the relevant sharded data for the content type. For example, if content for a particular content type are to be operated on by job types that are suited for parallel processing as well as by job types that are suited for linear processing, then the processing characteristics of the select one of the job type that is used more frequently for the content type is used when distributing the relevant sharded content. In this example, the select one of the job type may be suited for either parallel processing or linear processing. Content for the job types that are suited for parallel processing are distributed on a network of processing machines and the resources of the appropriate processing machines are engaged, in parallel, to process the content shards in response to a request for content. This form of dispersing across multiple processing machines and engaging distributed processing will result in faster processing of content while efficiently balancing the network load and the processing resources of the processing machines.

Along similar lines, sharded content for the job types that are suited for linear processing are distributed within one or a small cluster of processing machines that are in close processing proximity to one another. In some embodiments, the sharded content may be co-located within the one or more processing machines in the cluster. This form of dispersing will result in considerable reduction in the round trip latency as the related content are located in processing proximity to the processor and to one another within the one or small cluster of processing machines so that the content can be processed quickly using the resources of the relevant processing machines in the cluster. Other advantages will become apparent to one skilled in the art after viewing the various embodiments.

FIG. 1 illustrates an exemplary social graph 105 of users and/or entities within a social network. The social graph is depicted by nodes and edges, wherein each node represents an individual, entity, group or community of users (collectively termed "members") and the edge between any two nodes represents the relationship between the members represented by the nodes. The strength of the edges is reflective of the level of interaction between the members represented in the nodes. The strength of the edges can also depend on frequency and depth of interaction between two nodes. The level, frequency, depth of interactions and the relationship may depend on characteristics of the members associated with the nodes, such as age, gender, race, interest, affiliations (political, religious, business, etc.), occupation, education, economic status, type of service sought and/or provided, type of communication, etc. The members of the social network generate different types of interactions and different types of contents 110. Some exemplary interaction types may include communicative interactions 110-a, people-to-people interactions 110-b, entity-to-entity interactions 110-c, entity-to-people interactions 110-c, posts 110-d, etc. Similarly, information generated and exchanged by members within the social network span different content types, such as information, news, photographs, literary works, publications, music, art, opinions, ratings, images, videos, etc. The content types may be of different data types, such as audio 212-a, images 212-b, videos 212-c, texts or links 212-d, data 212-e, or any other form of digital asset. The type and level of interactions amongst members determines the type of job that needs to be performed on the different content types and how the content of different content types is to be sharded and stored so as to be able to optimize processing of the content. In some embodiments, the data to be sharded may not be associated with social interactions. In such embodiments, the data may be sharded in relation to a member's social data. For example, attributes about a member, such as age, name, gender, etc., are not really generated by a member nor are they social. However, it may make sense to shard the attribute related data based on the social graph. As a result, sharding and distribution encompasses data related to members, such as members' attributes and other metadata, as well as social interactions data.

Figure 2:
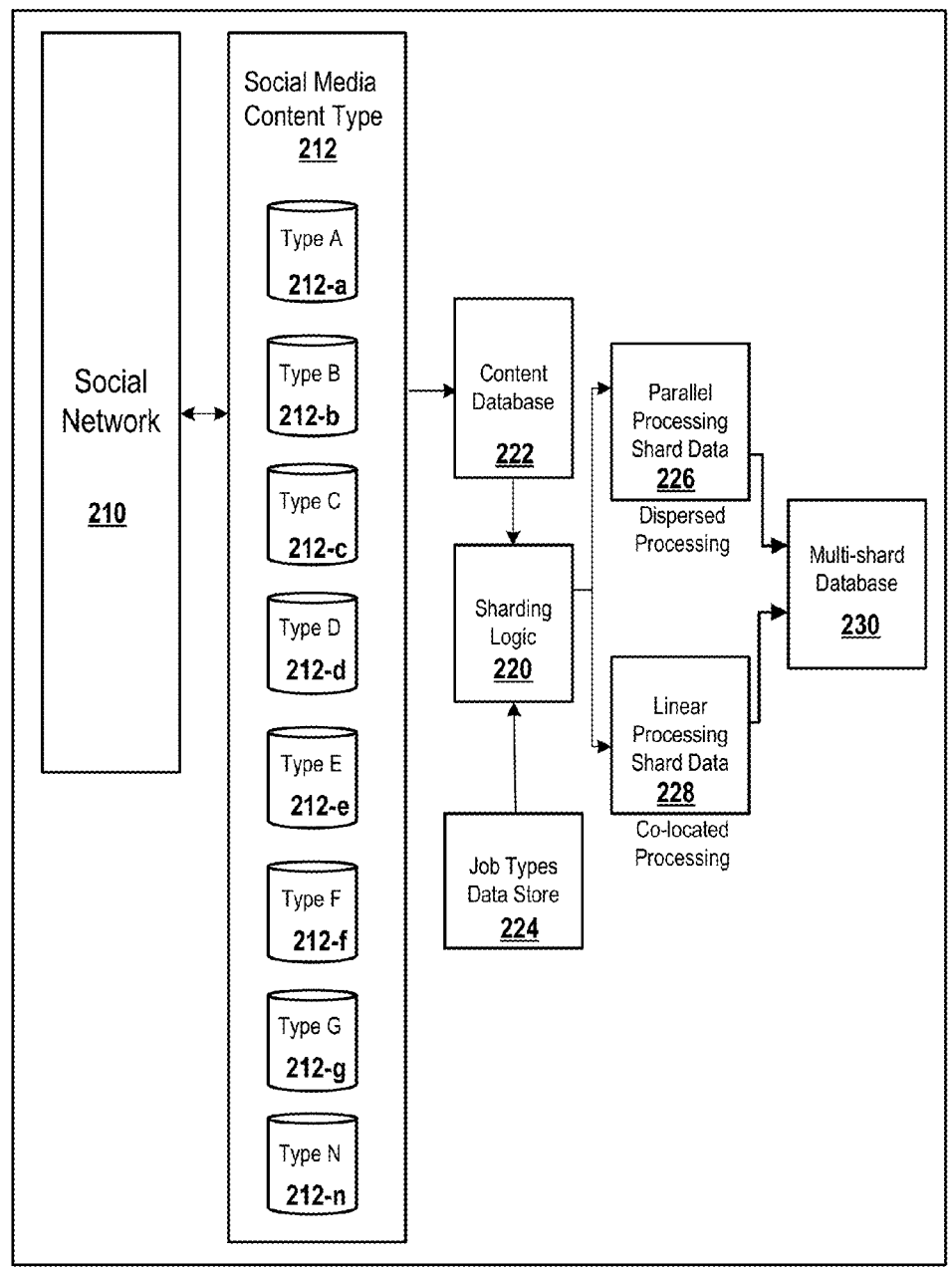
FIG. 2 illustrates a data sharding process flow implemented in accordance with an embodiment of the invention.

FIG. 2 illustrates a simplified block diagram identifying different modules of a sharding mechanism used for processing different content types of content generated within the social network. As mentioned earlier, the members interaction within the social network 210 result in the generation and exchange of a vast amount of content of different content types 212-a through 212-n. The content of different content types 212-a through 212-n are stored in the content database and made available to members of the social network. A plurality of content types may be of a particular data type. Each of the content types may be processed by one or more job types depending on how the content related to the content types are used within the social network. A sharding logic 220 is used for sharding the content within the content database 222 of the social network 210. Toward this end, the sharding logic 220 interacts with the one or more content databases 222 in which different content types of content for the social network are maintained to determine type of processing that needs to be done on each of the different content types. In one embodiment, content related to different content types for each data type may be maintained in distinct content databases. For example, content of different content types related to textual or link data types may be maintained in one content database, content of different content types related to image data types may be maintained in a second content database and so on.

The sharding logic (otherwise termed "sharding mechanism") 220 will determine the job types that may operate on the different content types of content maintained in the content database. In one embodiment, the sharding logic interacts with a job type data store 224 to determine the different job types that are contained therein. The sharding logic examines processing characteristics of each of the job types maintained within the job type data store 224 to determine the processing mode that is suited for the job type. The sharding logic then shards the content in the content database for the social network and categorizes the relevant sharded content associated with each job type. For example, the sharding logic 220 may identify sharded content that are to be mostly operated by job types suited for linear processing efficiency and categorize the content under linear processing shard data 228. Likewise, the sharding logic 220 may identify the sharded content that are to be mostly operated by job types that are suited for parallel processing efficiency and categorize the content under parallel processing shard data 226. In some embodiments, the sharded content may be tagged to identify the content as either parallel processing shard data 226 or linear processing shard data 228 depending on the job type that is to be operating on the content. The tag may serve two purposes. The tag may be used to identify the processing mode that is to be engaged in order to determine how the content of different content types is to be distributed. The tag may also be used to identify relevant content distributed across one, select few or a network of processing machines, in order to identify and retrieve relevant content for a particular job type when the job type executes and requests content. The tag information may be maintained at a master server for the social network and referenced to identify the relevant content for a job type. The linear processing shard data 228 and the parallel processing shard data together form the multi-shard database 230. The sharding logic then distributes the sharded content related to the various job types over one or a small cluster or a network of processing machines based on the associated tags so that processing of the sharded content can make efficient use of the network and processing resources of the respective processing machines.

As mentioned earlier, when more than one job type can be performed on content of a particular content type stored in the content database of the social network, the sharding logic will look at the historical association of the job types to the particular content type to statistically determine the rate of occurrence of each job type's association to the particular content type. The sharding logic will then select the job type with a higher statistical occurrence rate over other available job types, for performing on the select content type. In some embodiments, in addition to or instead of looking at the historical association of the job types to the content type, the sharding logic may determine the performance characteristics of the job type to determine which processing efficiency mode is more suited for the job type and update the processing characteristics of the job type to reflect the same. For example, historical association of a particular job type to a content type may indicate that the particular job type for processing the relevant content for the content type, is associated with linear processing efficiency. However, the performance characteristics for the job type may indicate that the linear processing is not best suited for processing the relevant content for this job type as processing of relevant content using the linear processing mode was taking too long. In such a case, the sharding logic may adjust the processing characteristics of the job type to relate to a different mode of processing. In the above example, the job type may be associated with parallel processing mode for the content type.

In one embodiment, the historical association of the job type to particular processing mode may be described by a set of pre-determined rules. The pre-determined rules map the job type to appropriate processing mode based on the processing characteristics of the job type. Some of the processing characteristics used in the mapping may include frequency of sharing of a content type, type and extent of sharing, amount of computation required for retrieving and presenting content, etc. The sharding logic uses the mapping defined in the pre-determined rules to associate a particular job type to a corresponding processing mode. The sharding logic then determines the particular job type that is to be performed on a content type and distributes the relevant sharded content for the particular content type in accordance to the processing mode mapped to the particular job type. As mentioned earlier, the mapping of the processing mode to the job type may or may not be optimal for the job type. When it is determined that the processing mode associated with a job type is not optimal, an alternate processing mode may be associated with the job type.

In one embodiment, to determine which mode of processing is more suited for the job type, the sharding logic monitors the performance efficiency of the job type over a pre-defined period of time or over a pre-defined number of content requests, to determine if the job type is performing at or above a desired efficiency level. The desired efficiency level may be defined by a pre-defined threshold value. If the job type is not performing at the desired efficiency level, the processing mode for storing the sharded content for the job type needs to be re-associated with a different processing mode or the level of sharding or processing mode may need to be fine tuned. The processing mode, as used in this application, is defined as a manner of processing the contents during for storage/retrieval. The processing mode for storing/retrieving includes parallel processing or linear processing. When the processing mode that is best suited for a job type is identified to be parallel processing mode, the sharding logic may distribute the sharded content related to the job type to a network of processing machines.

The monitoring of performance efficiency for a job type may be done periodically or intermittently. The frequency of monitoring may be driven by the need or demand for relevant content for a particular job type within the social network. In some embodiments, in the event the performance efficiency of a particular job type falls below the pre-defined threshold value, the job type may be switched to a different processing mode than the one that the job type is currently associated with so that the relevant content for the content type can be processed by the job type using the different processing mode. The pre-defined threshold value may be a time-based value, computation-based value, other metric-based value or a combination thereof. In some other embodiments, when the performance efficiency of a particular job type falls below the pre-defined threshold value, instead of switching to a different processing mode, the sharding of content may be fine-tuned. This might be the case when a particular job type is associated with parallel processing mode yet the performance efficiency falls below the pre-defined threshold value. In this case, the sharding logic may identify the relevant sharded content for the job type and adjust the sharding so that the relevant sharded content may be further sharded. The additional sharding will allow the sharded content to be distributed to additional processing machines so that retrieval of the relevant content can be done in a fast and efficient manner using the processing resources of the additional processing machines on which the relevant content shards are stored. Similarly, for a job type that might be associated with parallel processing mode but may be more suited for linear processing, the processing mode for the job type may be adjusted. In some embodiments, when the job type mapped to a particular processing mode is re-associated or re-mapped to a different processing mode, the pre-defined rules may be updated to reflect the changed processing mode. The monitoring and tuning of the job type may continue till an optimal level of performance for the job type has been reached.

Figure 3:
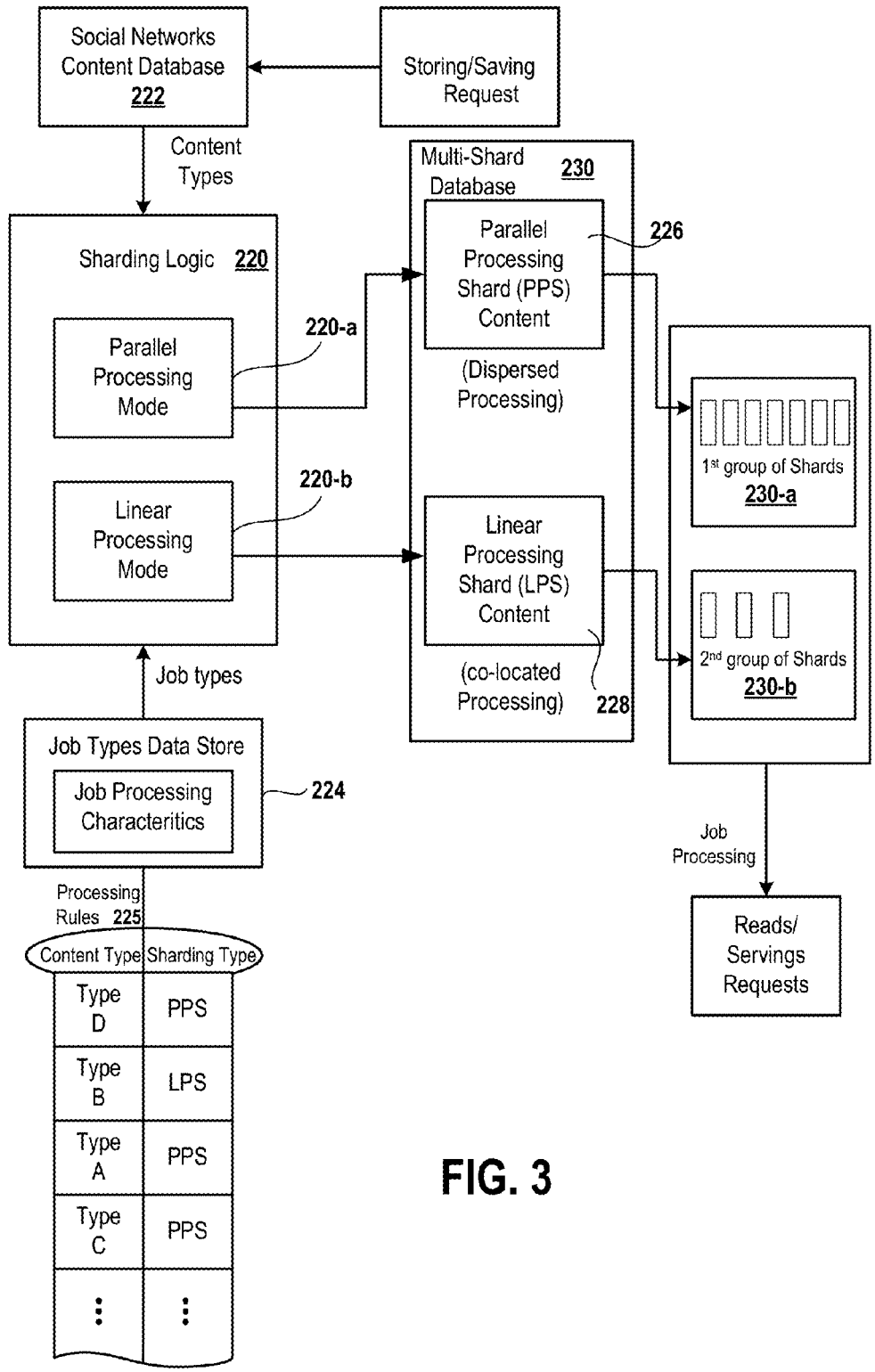
FIG. 3 illustrates an exemplary sharding logic used in sharding content of the social network database, in accordance with one embodiment of the invention.

FIG. 3 illustrates an exemplary processing of content of different content types through sharding logic module, in one embodiment. The processing of content begins when a request for storing or saving content generated by members of the social network, is received. The content generated by the members of the social network is stored in the content database 222. In response to the request, the sharding logic analyzes the content stored within the content database 222 to identify the different content types. The content types depend on information generated and exchanged between members and may include information, news, photographs, literary works, music, art, opinions, ratings, images, videos, etc. The content associated with the content types may be of different data types, such as audio, images, graphics, videos, texts or links, data, or any other form of digital asset that can be generated, rendered and shared by members of the social network.

Each content type may be processed by one or more job types. Processing characteristics of each job type available within the job type data store 224 predict or suggest the look-up pattern or the type and amount of processing that is to be performed on the content of particular content types that is mapped to the job type. A set of pre-determined processing rules 225 defined for the social network may be used to associate each job type to one of the two processing modes available within the sharding logic 220 based on the processing characteristics associated with the job type. For instance, the predetermined rules may associate a job type whose processing characteristics require parallel processing efficiency to the parallel processing mode 220-a and associate a job type whose processing characteristics require linear processing efficiency to the linear process mode 220-b.

The sharding logic will shard the content in the content database. Based on the mapping defined by the pre-determined rules 225 for the job types, the sharding logic will trigger either the parallel processing mode 220-a or the linear processing mode 220-b during the storing of the sharded content for content types that are associated with different job types. Thus, depending on which processing mode is associated with a job type, the sharding logic may identify the shards of the content for the relevant content types as parallel processing shard (PPS) content 226 or linear processing shard (LPS) content 228 and tag them accordingly. For example, the sharding logic may tag the PPS content 226 for dispersed processing and the LPS content 228 for co-location processing. The PPS content 226 and the LPS content 228 together define the multi-shard database 230.

The sharding logic will use the tags to disperse the sharded content to one or more processing machines. The sharding logic also retains the details of location of each of the content shards distributed over the processing machines by maintaining a mapping of each of the content shards' tags and the location where the respective content shards are stored so that retrieval of relevant content may be effectuated in an efficient manner. Thus, based on the tag, the PPS content 226 may be dispersed across a network of processing machines 230-a and the LPS content 228 on a single processing machine or across a small cluster of processing machines 230-b that are located in processing proximity to one another and the distribution location of both PPS content and LPS content may be maintained in a tag database (not shown). In some embodiments, the network of processing machines 230-a on which PPS content are dispersed may include a few to several hundreds to several thousands of processing machines located within a specific geo location or distributed across any geo location. The network of processing machines 230-a, in some embodiments, are not restricted to few, several hundreds or several thousands of processing machines but may include fewer or lot more processing machines, depending on the amount of PPS content to be dispersed for the job type. When request for content for a particular job type is received, the tag database is referenced to identify relevant content of content type that the job type is to operate on and the relevant content is retrieved from the location identified in the tag database.

Dispersing of data shards across a network of processing machines allows the job type, mapped to PPS processing mode, to utilize the resources of the processing machines, in parallel, to service the request for the relevant content making optimal use of the resources while efficiently balancing the processing load across multiple machines. The LPS content dispersed within the single or a small cluster of processing machines 230-b may be co-located within the single processing machine, co-located within same storage rack of the single processing machine, co-located within processing machines maintained in a single data center, co-located within storage racks of the processing machines in the single data center or co-located in storage racks of processing machines maintained in closely located data centers. The manner in which the LPS content is dispersed allows the job type, mapped to LPS processing mode to utilize the resources of single or small number of processing machines within the cluster to service the request resulting in substantial reduction of roundtrip latency between controller of the processing machines and the content shards.

It should be noted that any requests for storage or saving of content generated or exchanged by members of the social network are entertained at the social network database 222. Any requests for reading or processing of content are serviced using the respective content shards from one of the two shard data, PPS data 226 or LPS data 228, within the multi-shard database 230 based on the processing mode mapped to the job type that is used for performing on the requested content.

The processing mode mapped to each job type is not fixed but can be switched. The decision to switch the processing mode mapped to a particular job type may be accomplished by monitoring the job performance and evaluating the performance efficiency of the job. The job performance may be monitored periodically, intermittently, based on a trigger event, or based on a request or feedback from one or more members of the social network. The performance efficiency may be evaluated as a function of time-based metric, computation-based metric, any other metrics that can affect servicing of requests for content, or combinations thereof. When the sharding logic determines that the performance efficiency for the job type is below a pre-defined threshold value, the sharding logic may make the decision to switch the processing mode for the job type to improve the processing efficiency. In some embodiments, when the decision to switch the processing mode for the job type has been made, the sharding logic will copy the relevant content for the job type from the multi-shard database and re-distribute to the processing machines based on the switched processing mode. In some embodiments, the sharding logic may re-shard or additionally shard the relevant content copied from the multi-shard database and re-distribute the re-sharded content to a network of processing machines. For example, when the particular job type for performing on relevant content is associated with linear processing mode but is more suited for parallel processing mode, the sharding logic may switch the processing mode to parallel processing mode to take advantage of parallel processing. The processing of relevant content for the job type, in this example, is accomplished using resources of the multiple processing machines. If, on the other hand, the job type was already mapped to the PPS processing mode, then the sharding logic may further tune the processing mode to improve the performance efficiency for the job type. This may entail the sharding logic to re-shard or additionally shard the sharded content and use additional processing machines for storing. The requests for relevant content associated with the job type is serviced using the re-sharded content.

In one embodiment, upon servicing the requests, the re-sharded content may be discarded without updating the multi-shard database. In this embodiment, the original mapping of the processing mode to the job type within the pre-determined rules is maintained and is not updated. In another embodiment, the processing mode mapped to the job type for distribution of sharded content within the pre-determined rules 225 is updated so that future processing of relevant content for the job type is based on the switched processing mode. In this embodiment, the re-sharded content is not discarded but is re-tagged and dispersed in accordance to the new tag. The re-sharded content replaces the relevant content of the multi-shard database for the job type so that current and future requests for the relevant content will now be serviced using the tags of the re-sharded content from the multi-shard database.

Figure 4:
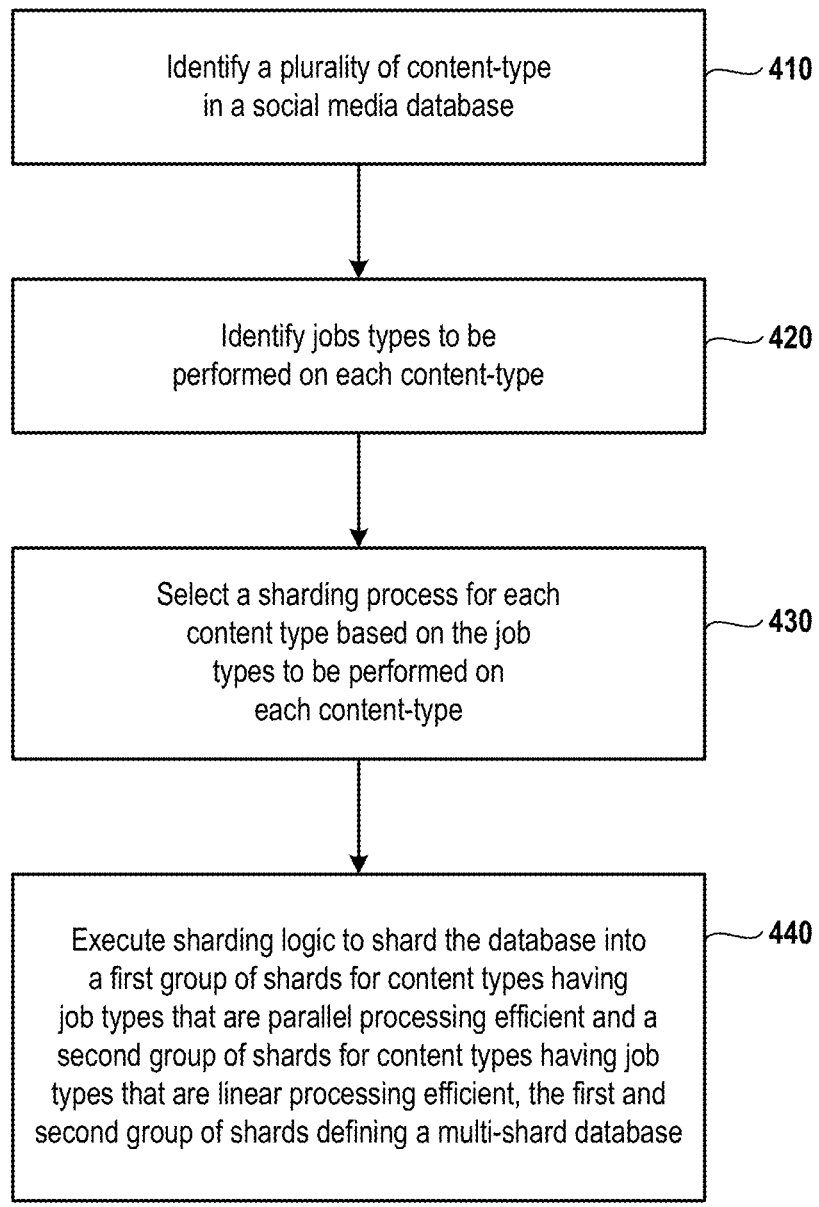
FIG. 4 illustrates exemplary method operations used for processing data obtained from a plurality of users in a social network, in accordance with an embodiment of the invention.

FIG. 4 illustrates method operations for providing effective sharding of content in a social network, in one embodiment of the invention. The method begins by identifying different content types associated with content in a database of the social network, as illustrated in operation 410. The content is produced and requested by members of the social network. The members may be individuals, entities, communities, groups, etc., that generate, request and exchange content of different content types. Content characteristics define the type of content. Some exemplary content types defined by content characteristics may include informative communication, news, research, stories, blogs, problems, problem resolutions, quotes, statistics, etc. The content types may be of different data types including audio, video, text, links, graphics, photos, images, data, etc.

A job type to be performed on each content type is identified, as illustrated in operation 420. The job type includes job characteristics that determine the type of processing that is scheduled to be performed on specific content types. Depending on the content type of the relevant content that needs to be accessed and the type of job that needs to be performed on the content types to service a request for content, a processing mode is selected, as illustrated in operation 430. The processing mode may be selected from one of two modes—parallel processing mode or linear processing mode.

The content from the content database are sharded by a sharding logic. The sharded content for content types with job types that are suited for parallel processing may be processed using parallel processing mode into first group of shards and sharded content for content types with job types that are suited for linear processing may be processed using the linear processing mode into second group of shards, as illustrated in operation 440. The data shards from the first group and the second group together form the multi-shard content database.

The method concludes with the requests for content from members of the social network being serviced from the multi-shard content database, as illustrated in operation 450. Any requests for content for job type that require parallel processing efficiency are provided content from the first group of shards using the resources of selects ones of a network of processing machines and requests for content for job type that require linear processing efficiency are provided content from the second group of shards using the resource of a processing machine or select ones of processing machines within a small cluster that are in processing proximity to one another.

In some embodiments, content of specific content types may be processed by more than one job type. In such embodiments, the sharding logic will determine the statistical occurrence rate of each job type for the content type and/or processing efficiency of each job type to determine which job type to associate with the content of the specific content type. Depending on the job type associated with the specific content type, the relevant content from either the first group or the second group of shards is used to service the requests.

Figure 5:
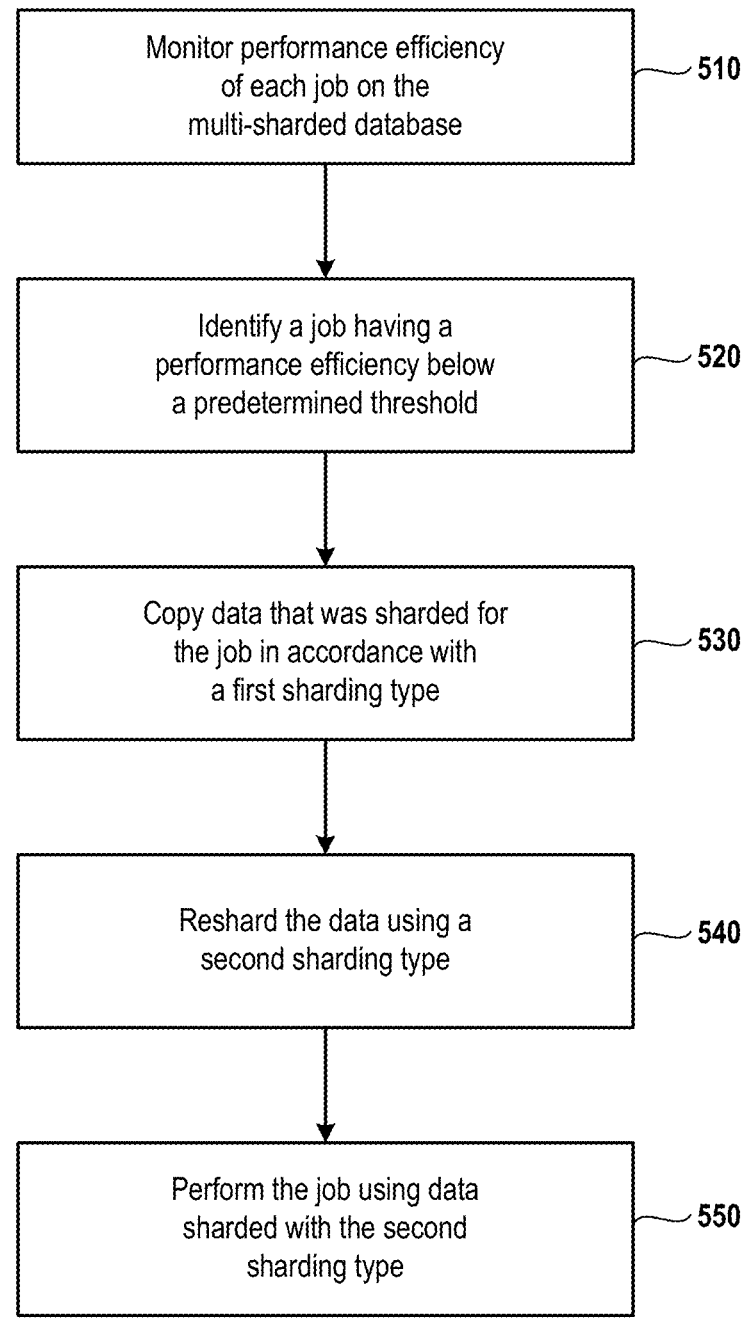
FIG. 5 illustrates method operations for processing content of a social network using appropriate sharding type, in accordance with an alternate embodiment of the invention.

FIG. 5 illustrates a method for providing content in a social network, in an alternate embodiment of the invention. The method begins at operation 510 wherein performance efficiency of each job type in a multi-shard database within a social network, is monitored. The multi-shard database includes content generated and exchanged by members within the social network that have already been sharded and processed using either a parallel processing mode or linear processing mode depending on the job types that are to be performed for the content types of the content. The multi-shard database includes a first group of shards that are suited for parallel processing efficiency and a second group of shards that are suited for linear processing efficiency.

The performance of each job type are monitored and performance efficiency of each job type is evaluated. In one embodiment, the performance efficiency is evaluated as a function of a time-based metric, a computation-based metric or may be evaluated using any other metric-based function or combinations thereof. The time-based metric for the job type may identify the amount of time taken for the job type to service or process the request for content in the multi-shard database. Computation-based metric may determine the level of computation required for the job type to service the request. Some job types may involve light computation while other job types may involve heavy or intense computation.

The performance efficiency value of each job type for the particular content type is compared against a pre-defined threshold value, as illustrated in operation 520. When the performance efficiency of a particular job type falls below the pre-defined threshold value, the relevant content that was processed for the job type is copied from the multi-shard database, as illustrated in operation 530. The relevant content for the job type may have been originally processed in accordance with a first processing mode. Upon copying the relevant content, the copied content is re-processed in accordance with a second processing mode that is different from the first processing mode, as illustrated in operation 540. This might also entail additional sharding of the relevant content to generate re-sharded content. The re-processed and/or re-sharded content is used to service any relevant content requests for the job type. The re-processed and/or re-sharded content may replace the relevant content in the multi-shard database. Alternately, the re-sharded content may be used to service the requests for content for the job type and discarded after servicing the request. Further monitoring may be done for each job type in the multi-shard database and depending on further evaluation of performance efficiency, the mapping of the job type to the processing mode may be updated so that future requests for content are serviced in a fast and efficient manner.

The various embodiments described above provide an improved way of partitioning content based on predictive look-up patterns established for each job type. For job types that require computationally intensive processing, such as requests for content related to social groups, engaging PPS processing mode to store relevant sharded content within the social network database will be more beneficial. With the PPS processing mode, the relevant sharded content are distributed across a network of processing machines spread across any geo location. Such distribution leads to optimal use of the resources of the select ones of the processing machines, in parallel, effective load-balancing and optimal use of network resources to service the requests for content. For job types that require computationally light processing, such as requests for content to determine popularity of a person, electronic mail groups, etc., LPS processing mode will be more appropriate as the relevant sharded content related to the LPS job types are co-located within a processing machine or co-located within a small cluster of processing machines that are in close processing proximity to one another. Such distribution within close cluster of processing machines will result in reduced round-trip latency between processing machines' controllers and the relevant content shards as the relevant content shards are located in close processing proximity to one another.

FIG. 6 is a simplified schematic diagram of a computer system for implementing embodiments of the present disclosure. It should be appreciated that the methods described herein may be performed with a digital processing system, which in some embodiments may be a general-purpose computer system. Special purpose computers, which are designed or programmed to perform only one function, may be used in the alternative. The computing device 602 includes a processor 604, which is coupled through a bus to memory 606, permanent storage 608, and Input/Output (I/O) interface 610.

Permanent storage 608 represents a persistent data storage device, e.g., a hard drive or a USB drive, which may be local or remote. Network interface 612 provides connections via network 614, allowing communications (wired or wireless) with other devices. It should be appreciated that processor 604 may be embodied in a general-purpose processor, a special purpose processor, or a specially programmed logic device. Input/Output (I/O) interface 610 provides communication with different peripherals and is connected with processor 604, memory 606, and permanent storage 608, through the bus. Sample peripherals include display 622, keyboard 618, mouse 620, removable media device 616, etc.

Display 622 is configured to display the user interfaces described herein. Keyboard 618, mouse 620, removable media device 616, and other peripherals are coupled to I/O interface 610 in order to exchange information with processor 604. It should be appreciated that data to and from external devices may be communicated through I/O interface 610. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 608, network attached storage (NAS), read-only memory or random-access memory in memory module 606, Compact Discs (CD), flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 614. Network 614 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware embodiments, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method, comprising:
   identifying a plurality of content types in a database of a social network, wherein members of the social network produce and request content from the database, and characteristics of the content define the content as certain ones of the content types;
   identifying job types to be performed on each content type when requests from members of the social network are received;
   selecting a sharding process for each content type based on processing characteristics of the job types to be performed on the content type;
   sharding, by a processor, the database into a first group of shards for content types having job types with a first set of processing characteristics, wherein the first set of processing characteristics indicate that the associated job types are parallel processing efficient; sharding, by the processor, the database into a second group of shards for content types having job types with a second set of processing characteristics, wherein the second set of processing characteristics indicate that associated job types are linear processing efficient, the first and second group of shards defining a multi-shard database; and
   servicing requests for content from the multi-shard database, wherein the requests for content associated with job types having parallel processing efficiency are provided content from the first group of shards and requests for content associated with job types having linear processing efficiency are provided content from the second group of shards.

2. The method of claim 1, wherein the job type to be performed on a content type is selected from a plurality of possible job types, the selected job type has a statistical occurrence rate that is higher than other job types of the plurality of possible job types.

3. The method of claim 1, wherein the job type to be performed on a content type is identified based on job processing characteristics associated with the job type, wherein pre-determined rules associate processing characteristics of the job type to a sharding type.

4. The method of claim 1, further includes dispersing the first group of shards having job types that are parallel processing efficient across a distributed network of processing machines.

5. The method of claim 4, wherein servicing the requests for content further includes engaging resources of select ones of the processing machines in parallel, wherein the requests include storage or retrieval of relevant content from the multi-shard database dispersed on the processing machines.

6. The method of claim 1, further includes dispersing the second group of shards having job types that are linear processing efficient on a close cluster of one or more processing machines that are situated in close processing proximity to one another.

7. The method of claim 6, wherein the dispersing of the second group of shards includes co-locating the shards in each processing machines of the close cluster.

8. The method of claim 1, further includes,
   monitoring performance efficiency of each job type on the multi-shard database;
   when the performance efficiency of a job type drops below a pre-defined threshold value,
      copying content for the job type that was sharded in accordance with the first sharding type, from the multi-shard database; and
      re-sharding the content for the job type in accordance with the second sharding type, wherein the re-sharded content is used for servicing the requests for content for the job type.

9. The method of claim 8, further includes replacing the content within the multi-shard database for the job type with the re-sharded content.

10. The method of claim 8, further includes discarding the re-sharded content upon completion of servicing requests for content for the job type.

11. The method of claim 8, wherein the pre-defined threshold value is a time-based value or computation-based value.

12. A non-transitory computer readable medium having programming instructions, which when executed by a processor, cause the processor to perform a method comprising:
   identifying a plurality of content types in a database of a social network, wherein members of the social network produce and request content from the database, and characteristics of the content define the content as certain ones of the content types;
   identifying job types to be performed on each content type when requests from members of the social network are received;
   selecting a sharding process for each content type based on processing characteristics of the job types to be performed on the content types;

sharding the database into a first group of shards for content types having job types with a first set of processing characteristics, wherein the first set of processing characteristics indicate that the associated job types are parallel processing efficient; sharding the database into a second group of shards for content types having job types with a second set of processing characteristics, wherein the second set of processing characteristics indicate that associated job types are linear processing efficient, the first and second group of shards defining a multi-shard database; and servicing requests for content from the multi-shard database, wherein the requests for content associated with job types having parallel processing efficiency are provided content from the first group of shards and requests for content associated with job types having linear processing efficiency are provided content from the second group of shards.

13. The computer readable medium of claim 12, wherein the method further comprises:
monitoring performance efficiency of each job type on the multi-shard database;
when the performance efficiency of a job type drops below a pre-defined threshold value,
copying content for the job type that was sharded in accordance with the first sharding type, from the multi-shard database; and
re-sharding the content for the job type in accordance with the second sharding type, wherein the re-sharded content is used for servicing the requests for content for the job type,
wherein the pre-defined threshold value is a time-based value or computation-based value.

14. The computer readable medium of claim 13, wherein the method further comprises replacing the content within the multi-shard database for the job type with the re-sharded content.

15. The computer readable medium of claim 13, wherein the method further comprises discarding the re-sharded content upon completion of servicing requests for content for the job type.

16. A system, comprising:
a memory; and
a processing device operatively coupled to the memory, the processing device to:
identify a plurality of content types in a database of a social network, wherein members of the social network produce and request content from the database, and characteristics of the content define the content as certain ones of the content types;
identify job types to be performed on each content type when requests from members of the social network are received;
select a sharding process for each content type based on processing characteristics of the job types to be performed on the content types;
shard the database into a first group of shards for content types having job types with a first set of processing characteristics, wherein the first set of processing characteristics indicate that the associated job types are parallel processing efficient;
sharding the database into a second group of shards for content types having job types with a second set of processing characteristics, wherein the second set of processing characteristics indicate that associated job types are linear processing efficient, the first and second group of shards defining a multi-shard database; and
service requests for content from the multi-shard database, wherein the requests for content associated with job types having parallel processing efficiency are provided content from the first group of shards and requests for content associated with job types having linear processing efficiency are provided content from the second group of shards.

17. The system of claim 16, wherein the processing device is further to:
monitor performance efficiency of each job type on the multi-shard database;
when the performance efficiency of a job type drops below a pre-defined threshold value,
copy content for the job type that was sharded in accordance with the first sharding type, from the multi-shard database; and
re-shard the content for the job type in accordance with the second sharding type, wherein the re-sharded content is used for servicing the requests for content for the job type,
wherein the pre-defined threshold value is a time-based value or computation-based value.

18. The system of claim 17, wherein the processing device is further to replace the content within the multi-shard database for the job type with the re-sharded content.

19. The system of claim 17, wherein the processing device is further to discard the re-sharded content upon completion of servicing requests for content for the job type.

20. The system of claim 17, wherein the pre-defined threshold value is a time-based value or computation-based value.

* * * * *